US011895386B2

(12) United States Patent
Mireault et al.

(10) Patent No.: US 11,895,386 B2
(45) Date of Patent: *Feb. 6, 2024

(54) CAMERA WITH FOLDED OPTICS AND BEARING SUSPENSION

(71) Applicant: Apple Inc., Cupertino, CA (US)

(72) Inventors: Alfred N. Mireault, San Francisco, CA (US); Nicholas D. Smyth, San Jose, CA (US); Scott W. Miller, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/808,971

(22) Filed: Jun. 24, 2022

(65) Prior Publication Data
US 2022/0321746 A1 Oct. 6, 2022

Related U.S. Application Data

(63) Continuation of application No. 16/858,425, filed on Apr. 24, 2020, now Pat. No. 11,375,091.

(60) Provisional application No. 62/840,309, filed on Apr. 29, 2019.

(51) Int. Cl.
H04N 23/55 (2023.01)
G02B 5/04 (2006.01)
H04N 23/51 (2023.01)
H04N 23/54 (2023.01)

(52) U.S. Cl.
CPC ............ H04N 23/55 (2023.01); G02B 5/045 (2013.01); H04N 23/51 (2023.01); H04N 23/54 (2023.01)

(58) Field of Classification Search
CPC ........ H04N 23/55; H04N 23/51; H04N 23/54; G02B 5/045; G02B 7/1805; G02B 13/0065; G02B 7/021
See application file for complete search history.

(56) References Cited

U.S. PATENT DOCUMENTS

| 11,375,091 | B1 | 6/2022 | Mireault et al. | |
| 2006/0017834 | A1* | 1/2006 | Konno | G02B 13/0065 348/335 |
| 2014/0009631 | A1 | 1/2014 | Topliss | |
| 2015/0288865 | A1 | 10/2015 | Osborne | |
| 2015/0358528 | A1* | 12/2015 | Brodie | G03B 3/10 348/345 |
| 2015/0365568 | A1* | 12/2015 | Topliss | G02B 27/646 348/360 |
| 2017/0359568 | A1* | 12/2017 | Georgiev | H01L 27/14627 |
| 2018/0067335 | A1 | 3/2018 | Chen et al. | |
| 2019/0121103 | A1 | 4/2019 | Bachar et al. | |
| 2019/0141248 | A1 | 5/2019 | Hubert et al. | |
| 2019/0377155 | A1 | 12/2019 | Bachar et al. | |

FOREIGN PATENT DOCUMENTS

WO 2018007981 1/2018

* cited by examiner

Primary Examiner — Padma Haliyur
(74) Attorney, Agent, or Firm — Robert C. Kowert; Kowert, Hood, Munyon, Rankin & Goetzel, P.C.

(57) ABSTRACT

Various embodiments include a camera with folded optics and a bearing suspension arrangement. In some examples, a folded optics arrangement of the camera may include one or more lens elements and light path folding elements (e.g., prisms). Some embodiments include voice coil motor (VCM) actuator arrangements.

20 Claims, 12 Drawing Sheets

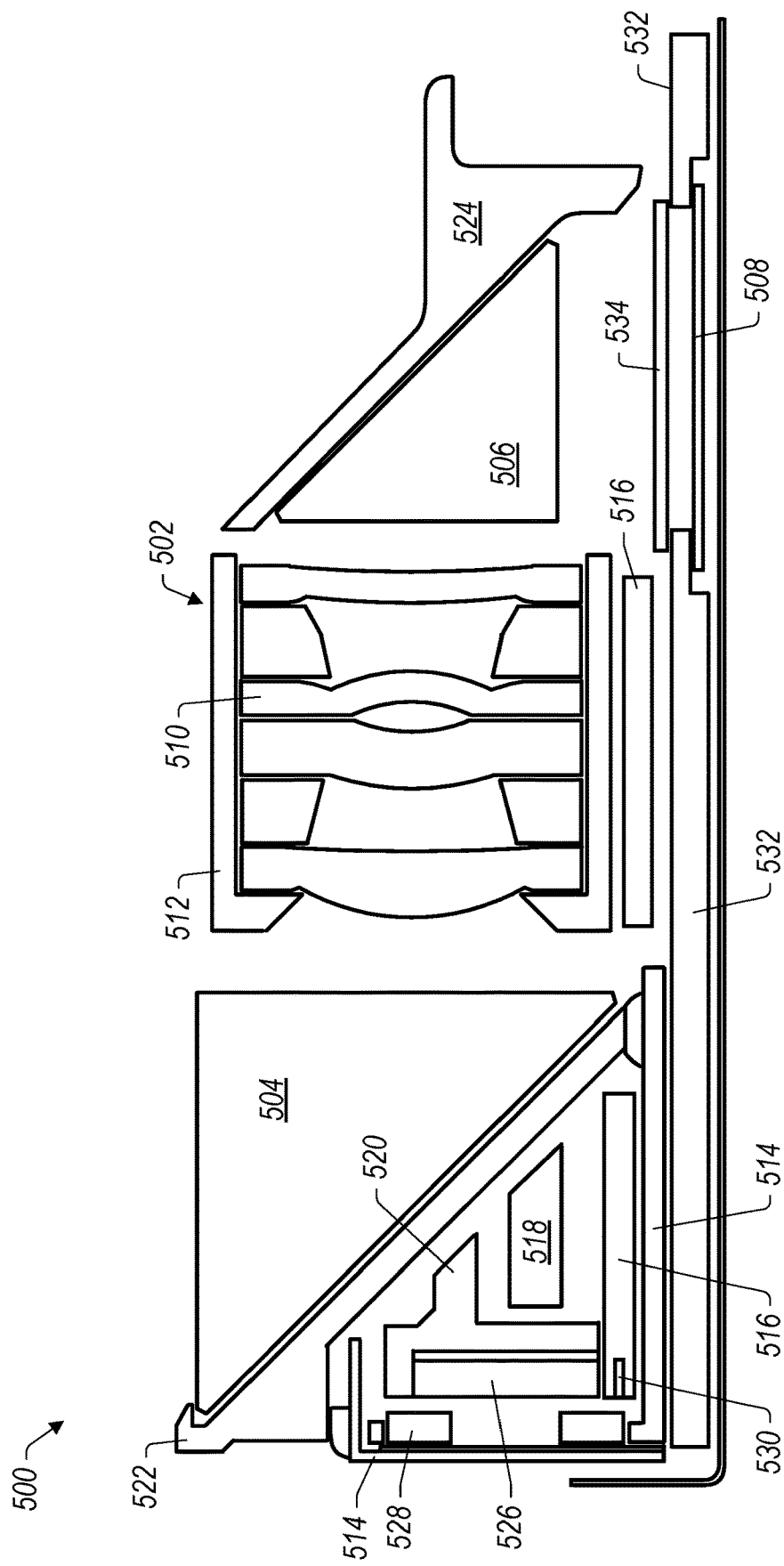

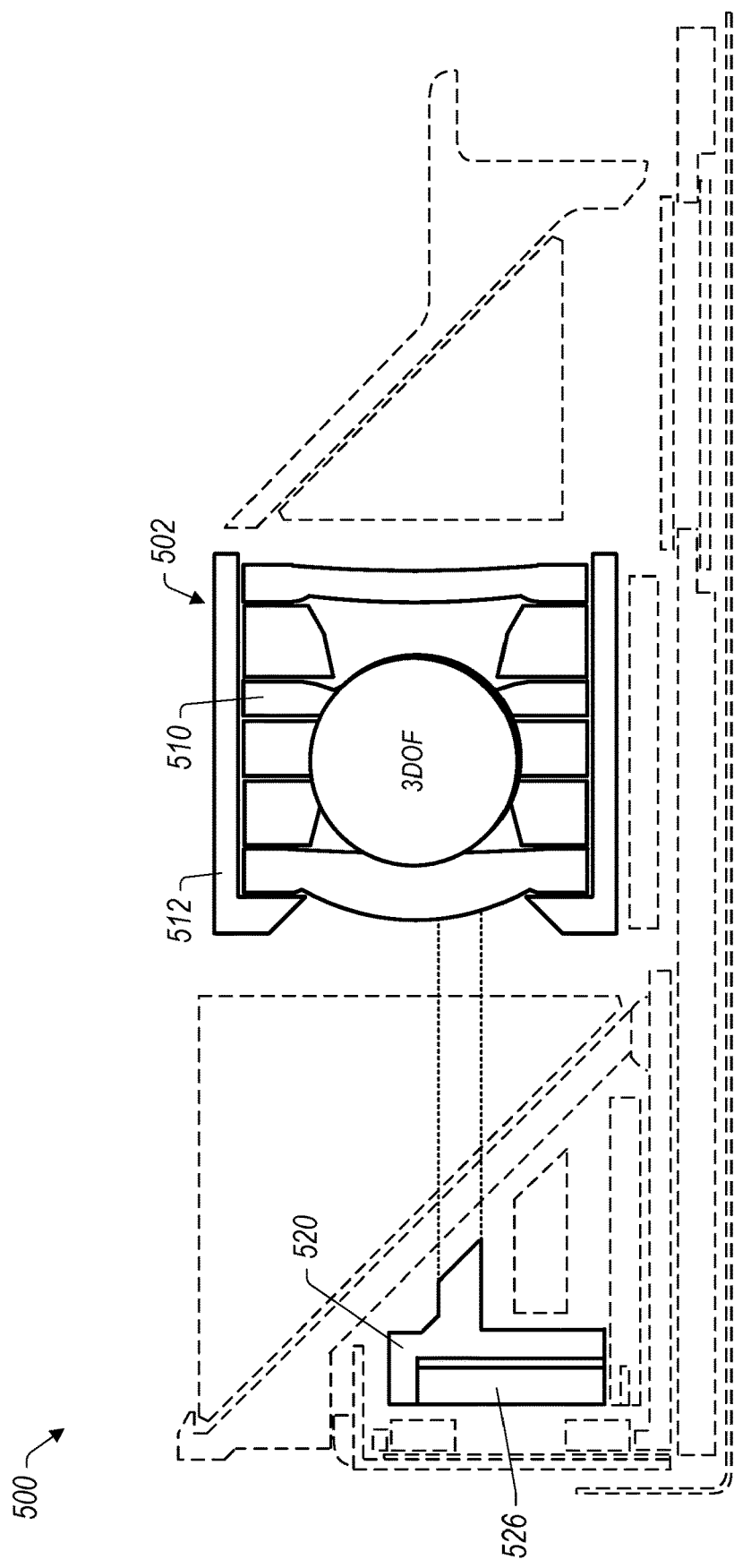

CAMERA WITH FOLDED OPTICS AND BEARING SUSPENSION

This application is a continuation of U.S. patent application Ser. No. 16/858,425, filed Apr. 24, 2020, which claims benefit of priority to U.S. Provisional Application No. 62/840,309, filed Apr. 29, 2019, which are hereby incorporated by reference in their entirety.

BACKGROUND

Technical Field

This disclosure relates generally to architecture for a camera with folded optics and a bearing suspension arrangement.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIGS. 5A-5B illustrate side cross-sectional views of another example camera with a folded optics arrangement and a bearing suspension arrangement, in accordance with some embodiments.

FIG. 6A shows a perspective view of the camera. FIG. 6B shows a front cross-sectional view of the camera, including an example magnetic arrangement (e.g., magnet(s) and coil(s) of one or more actuators for shifting one or more optical components). FIG. 6C shows a side cross-sectional view of the camera, including the magnetic arrangement.

Figure 1:
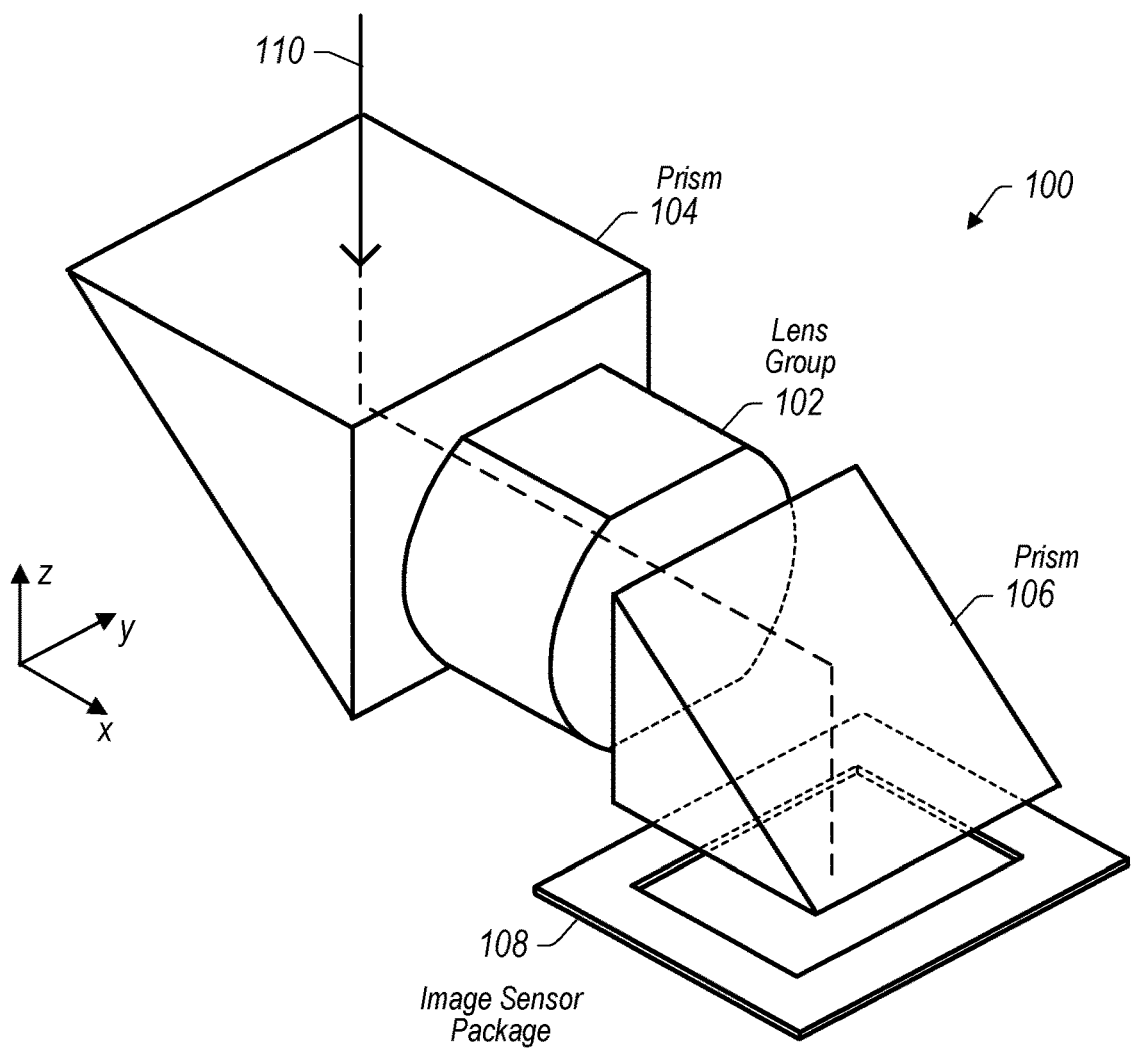
FIG. 1 illustrates a perspective view of an example camera with a folded optics arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms.

These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and/or optical image stabilization (OIS). One approach to delivering a very compact actuator for AF and/or OIS is to use a voice coil motor (VCM) actuator.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Described here are folded optics arrangements for providing a reduced-height imaging system. The arrangements discussed throughout generally comprise one or more lenses positioned between two light path folding elements, which collectively provides a dual-folded light path. The one or more lenses (and/or one or more light path folding elements) may be moveable to provide autofocus and/or image stabilization during imaging. FIG. 1 shows a generalized example of a camera 100 with a folded optics arrangement. The example X-Y-Z coordinate system shown in FIG. 1 is used to discuss aspects of systems and/or system components, and may apply to embodiments described throughout this disclosure.

In various embodiments, the camera 100 may include a lens group 102, a first prism 104, a second prism 106, and an image sensor package 108. The lens group 102 may include one or more lens elements. In some embodiments, the lens group 102 may be located between the first prism 104 and the second prism 106, forming the folded optics arrangement. Light may follow an optical path 110 that is folded by the first prism 104 such that the light is directed towards the lens group 102, passes through the lens group 102, and is folded by the second prism 106 such that the light is directed towards the image sensor package 108. In some examples, light may enter an object side of the first prism 104 along the Z-axis. The first prism 104 may redirect the light to propagate along the X-axis (which may be parallel to an optical axis defined by the lens group 102) towards the lens group 102. The second prism 106 may redirect the light to propagate along the Z-axis (which may be orthogonal to a plane defined by the image sensor package 108), e.g., such that the light exits an image side of the second prism 106 towards the image sensor package 108. The first prism 104, the lens group 102, and/or the second prism 106 may be positioned along a common axis (e.g., the X-axis, the optical axis defined by the lens group 102, etc.). According to some examples, the optical path 110 may be contained within a plane (e.g., the X-Z plane), and the image sensor package 108 may extend along a different plane (e.g., the X-Y plane).

In some embodiments, the object side of the first prism 104 may extend along the X-Y plane. Furthermore, the first prism 104 may include a pair of opposing lateral sides that each extend along the X-Z plane, a lens group facing side that extends along the Y-Z plane, and a reflecting surface side that is angled relative to one or more of the other sides of the first prism 104. For example, the reflecting surface side of the first prism 104 may include a reflective surface that is angled so as to redirect light received from the object side of the first prism 104 towards the lens group 102 (via the lens group facing side of the first prism 104), as discussed above.

In some embodiments, the image side of the second prism 106 may extend along the X-Y plane, e.g., proximate the image sensor package 108. Furthermore, the second prism 106 may include a pair of opposing lateral sides that each extend along the X-Z plane, a lens group facing side that extends along the Y-Z plane, and a reflecting surface side that is angled relative to one or more of the other sides of the second prism 106. For example, the reflecting surface side of the second prism 106 may include a reflective surface that is angled so as to redirect light received from the lens group 102 (via the lens group facing side of the second prism 106) towards the image sensor package (via the image side of the second prism 106), as discussed above.

While the light path folding elements are shown in various figures as comprising prisms (e.g., the first prism 104 and the second prism 106), the camera systems and/or folded optics arrangements described herein may include any suitable light path folding element (e.g., a mirror or the like) or combination of elements. In some embodiments, one or more of the light path folding elements may also act as a lens element (or combination of lens elements). For example, one or more lens elements (e.g., other than those of the lens group 102) may be integrated with the first prism 104 (and/or the second prism 106) such that the prism acts as a lens element. Additionally, or alternatively, the first prism 104 (and/or the second prism 106) may be shaped such that the prism acts as a lens element.

Figure 2:
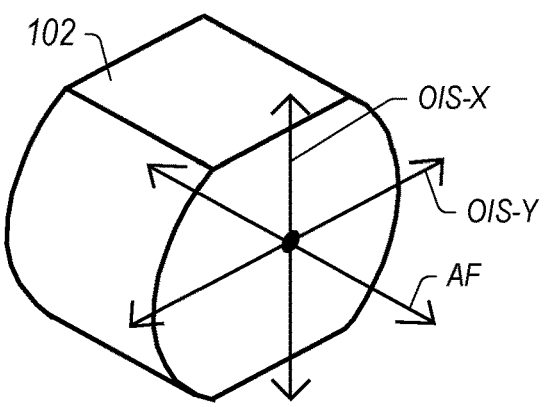
FIG. 2 illustrates an example of 3-axis movement of a lens group within a folded optics arrangement, in accordance with some embodiments.

As will be discussed in further detail below, the lens group 102 may be coupled with an actuator structure that is configured to move the lens group 102 along multiple axes, e.g., to provide autofocus (AF) and/or optical image stabilization (OIS) functionality. FIG. 2 shows an example of 3-axis movement of the lens group 102 to provide AF and/or OIS functionality. For example, the lens group 102 may be shifted (e.g., by an actuator structure, such as the actuator structures/arrangements discussed in further detail below) along the X-axis to provide AF movement. Additionally, or alternatively, the lens group 102 may be shifted along the Z-axis to provide OIS-X movement (e.g., movement that shifts the image projected on the image sensor package 108 in one or more directions parallel to the X-axis). Additionally, or alternatively, the lens group 102 may be shifted along the Y-axis to provide OIS-Y movement (e.g., movement that shifts the image projected on the image sensor package 108 in one or more directions parallel to the Y-axis). In some embodiments, one or more light path folding elements may also be coupled with the actuator structure. For example, the first prism 104 and the lens group 102 may be coupled with the actuator structure, and the actuator structure may move the first prism 104, together with the lens group 102, along multiple axes to provide AF and/or OIS functionality, e.g., as discussed below with reference to FIGS. 4A-4B.

Figure 3:
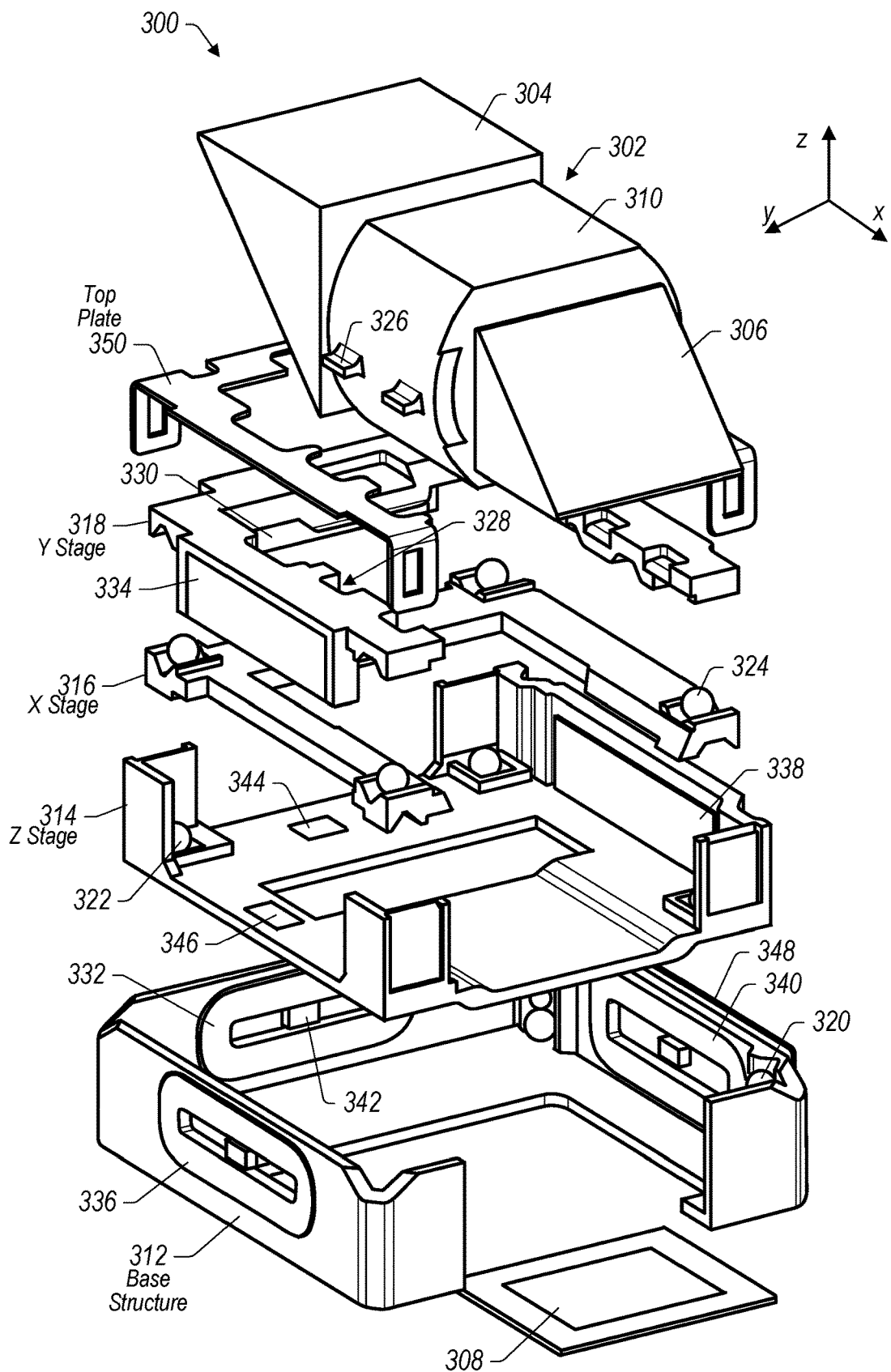
FIG. 3 shows an exploded view of an example camera with a folded optics arrangement and an example bearing suspension arrangement, in accordance with some embodiments.

FIG. 3 shows an exploded view of an example camera 300 with a folded optics arrangement and an example bearing suspension arrangement, in accordance with some embodiments. In some embodiments, the camera 300 may include a lens group 302, a first prism 304, a second prism 306, and an image sensor 308. The lens group 302 may include one or more lens elements disposed within a lens barrel 310.

In various embodiments, the camera 300 may include a bearing suspension arrangement and/or an actuator module that may be used for controlled movement of the lens group 302 and/or one or more light path folding elements (e.g., the first prism 304). In some embodiments, the bearing suspension arrangement may include a base structure 312, a Z stage 314, an X stage 316, and/or a Y stage 318. The base structure 312 may be in a fixed position relative to movement of the Z stage 314, the X stage 316, and the Y stage 318. The bearing suspension arrangement may be coupled with the lens group 302 and may allow the lens group 302 to move in multiple directions relative to the image sensor 308. For example, the bearing suspension arrangement may enable movement of the lens group 302 in three degrees of freedom (3DOF).

In some embodiments, the Z stage 314 may rest on (or otherwise be disposed above) the base structure 312, and may be configured to move in the Z-axis direction, e.g., along Z-movement ball bearings 320 (e.g., made of steel, ceramic, etc.) disposed between the Z stage 314 and the base structure 312. In some embodiments, the X stage 316 may rest on (or otherwise be disposed above) the Z stage 314, and may be configured to move in the X-axis direction, e.g., along the X-movement ball bearings 322 (e.g., made of steel, ceramic, etc.) disposed between the X stage 316 and the Z stage 314. In some embodiments, the Y stage 318 may rest on (or otherwise be disposed above) the X stage 316, and may be configured to move in the Y-axis direction, e.g., along the Y-movement ball bearings 324 (e.g., made of steel, ceramic, etc.) disposed between the Y stage 318 and the X stage 316. Furthermore, in some embodiments, the X stage 316 and/or the Y stage 318 may move in the Z-axis direction together with the Z stage 314 (e.g., due to movement of the Z stage 314 in the Z-axis direction). According to various embodiments, the lens group 302 may be coupled to the Y stage 318, e.g., such that the lens group 302 moves together with the Y stage 318. For example, the lens barrel 310 may have one or more protrusions 326 (e.g., extending from opposing sides of the lens barrel 310) configured to be disposed at least partially within one or more corresponding recesses 328 defined by the Y stage 318. In some examples, an adhesive may be used to fixedly attach the protrusion(s) 326 to the corresponding recess(es) 328, and thus fixedly attach the lens group 302 to the Y stage 318. One or more other optical elements may also be attached to the Y stage 318. For example, the first prism 304 may be fixedly attached to the Y stage 318 in some embodiments.

As indicated above, the actuator module may provide for shifting the lens group 302 along multiple axes (e.g., via movement of the Z stage 314, the X stage 316, and/or the Y stage 318, as described herein) to provide AF and/or OIS movement. In some embodiments the actuator module may comprise a voice coil motor (VCM) actuator module that includes one or more VCM actuators. For instance, the actuator module may include one or more magnets and one or more coils. The magnets and coils may magnetically interact (e.g., when electrical current is provided to the coils) to produce Lorentz forces that move the lens group 302.

In some embodiments, the actuator module may include an AF VCM actuator (e.g., to provide AF movement), an OIS-Y VCM actuator (e.g., to provide OIS-Y movement), and an OIS-X VCM actuator (e.g., to provide OIS-X movement). For example, the AF VCM actuator may include an AF magnet 330 and an AF coil 332. The AF magnet 330 may be attached to the Y stage 318. Furthermore, the AF coil 332 may be attached to the base structure 312. In some embodiments, the OIS-Y VCM actuator may include an OIS-Y magnet 334 and an OIS-Y coil 336. The OIS-Y magnet 334 may be attached to the Y stage 318. Furthermore, the OIS-Y coil 336 may be attached to the base structure 312. In some embodiments, the OIS-X VCM actuator may include an OIS-X magnet 338 and an OIS-X coil 340. The OIS-X magnet 338 may be attached to the Z stage 318. Furthermore, the OIS-Y coil 340 may be attached to the base structure 312.

In some embodiments, the camera 300 may include a position sensor arrangement that includes one or more position sensors 342 for position sensing with respect to AF movement, OIS-Y movement, and/or OIS-X movement. The position sensor(s) 342 may be magnetic field sensors (e.g., Hall sensors, tunneling magnetoresistance (TMR) sensors, giant magnetoresistance (GMR) sensors, etc.) in various embodiments. In some embodiments, a respective position sensor may be located proximate each respective coil of the actuator module. For example, each position sensor may be encircled by a respective coil, as indicated in FIG. 3.

In some embodiments, the base structure 312 and/or the stages of the bearing suspension arrangement may be configured to be packaged around an optical payload on multiple sides, e.g., three sides (or U-shaped) as indicated in FIG. 3.

In some embodiments, the base structure 312 may form vertical corners that define grooves (e.g., extending in the Z-axis direction) within which Z-movement ball bearings 320 may be disposed. For example, each of two sets of four vertically stacked Z-movement ball bearings 320 may be disposed in a respective corner proximate the OIS-X coil 340, e.g., as indicated in FIG. 3. The Z-stage 314 may form corresponding grooves (e.g., extending in the Z-axis direction) configured to engage the Z-movement ball bearings 320 and allow the Z-stage 314 to move in the Z-axis direction.

In some embodiments, the Z stage 314 may have corners at which recesses may be formed. One or more X-movement ball bearings 322 may be disposed within each of the recesses. For example, as indicated in FIG. 3, each of four X-movement ball bearings 322 may be disposed in a respective one of four corner recesses. A bottom portion of the X stage 316 may form corresponding grooves (e.g., extending in the X-axis direction) configured to engage the X-movement ball bearings 322 and allow the X stage 316 to move in the X-axis direction.

In some embodiments, the X stage 316 may have an upper portion with corners at which grooves may be formed. One or more Y-movement ball bearings 324 may be disposed within each of the grooves. For example, as indicated in FIG. 3, each of four Y-movement ball bearings 324 may be disposed in a respective one of the four corner grooves. A bottom portion of the Y stage 318 may form corresponding grooves (e.g., extending in the Y-axis direction) configured to engage the Y-movement ball bearings 324 and allow the Y stage 318 to move in the Y-axis direction.

According to some embodiments, the Z stage 314, the X stage 316, and/or the Y stage 318 may be preloaded against ball bearings (e.g., the Z-movement ball bearings 320, the X-movement ball bearings 322, and/or the Y-movement ball bearings 324) of the bearing suspension arrangement. In some examples, a ferritic component 344 (e.g., iron, stainless steel, etc.) may be attached to the Z stage 314 below the AF magnet 330 to preload the X stage 316 and/or the Y stage 318 against one or more of the ball bearings of the bearing suspension system. In some embodiments, the ferritic component 344 may be insert-molded into the Z stage 314. Another ferritic component 346 may be attached to the Z stage 314 below the OIS-Y magnet 334 to preload the X stage 316 and/or the Y stage 318 against one or more of the ball bearings of the bearing suspension system. In some embodiments, the ferritic component 346 may be insert-molded into the Z stage 314. Another ferritic component 348 may be attached to the OIS-X coil 340 and/or to the base structure 312 (e.g., proximate the OIS-X coil 340 and/or the OIS-X magnet 338) to preload the Z stage 314 against one or more of the ball bearings of the bearing suspension system.

In some embodiments, the camera 300 may include a top plate 350 disposed above the Y stage 318. The top plate 650 may have tabs that each extend downwards at a respective corner of the top plate 650. The tabs may be configured to be disposed within corresponding recesses that are each formed at a respective corner of the Z stage 314. The tabs may be attached (e.g., using an adhesive) to the corresponding recesses such that the top plate 350 and the Z stage 314 sandwich the X stage 314 and the Y stage 318.

According to various embodiments, the bearing suspension arrangement may provide for scaling/increasing actuator strokes, which may enable, for example, higher OIS compensation angles. Furthermore, due to high in-plane stiffness, the bearing suspension arrangement may provide for scaling/increasing the moving mass of the optic al payload, which may, for example, enable improved optical specifications). For example, in contrast to some other suspension architectures (e.g., some flexure suspension architectures), the bearing suspension arrangement may be used to move an optical payload comprising a lens group and a prism (e.g., an optically powered prism). Such an optical payload is described below with reference to FIGS. 4A-4B. Some other suspension architectures may not have adequate characteristics (e.g., in-plane stiffness) to support an optical payload that may be supported by the bearing suspension arrangement described herein.

Figure 4A:
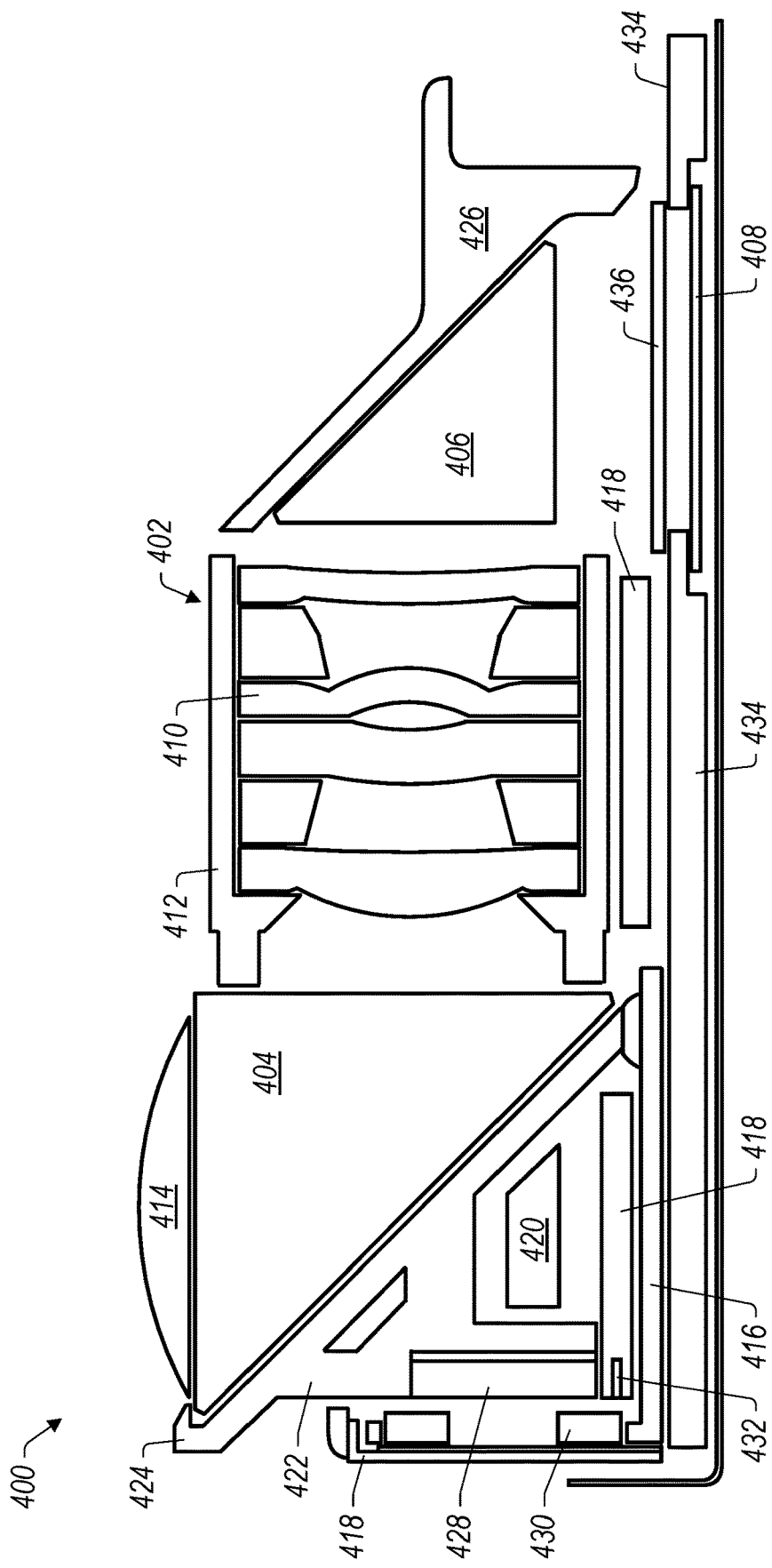
FIGS. 4A-4B illustrate side cross-sectional views of an example camera with a folded optics arrangement and a bearing suspension arrangement, in accordance with some embodiments.
Figure 4B:
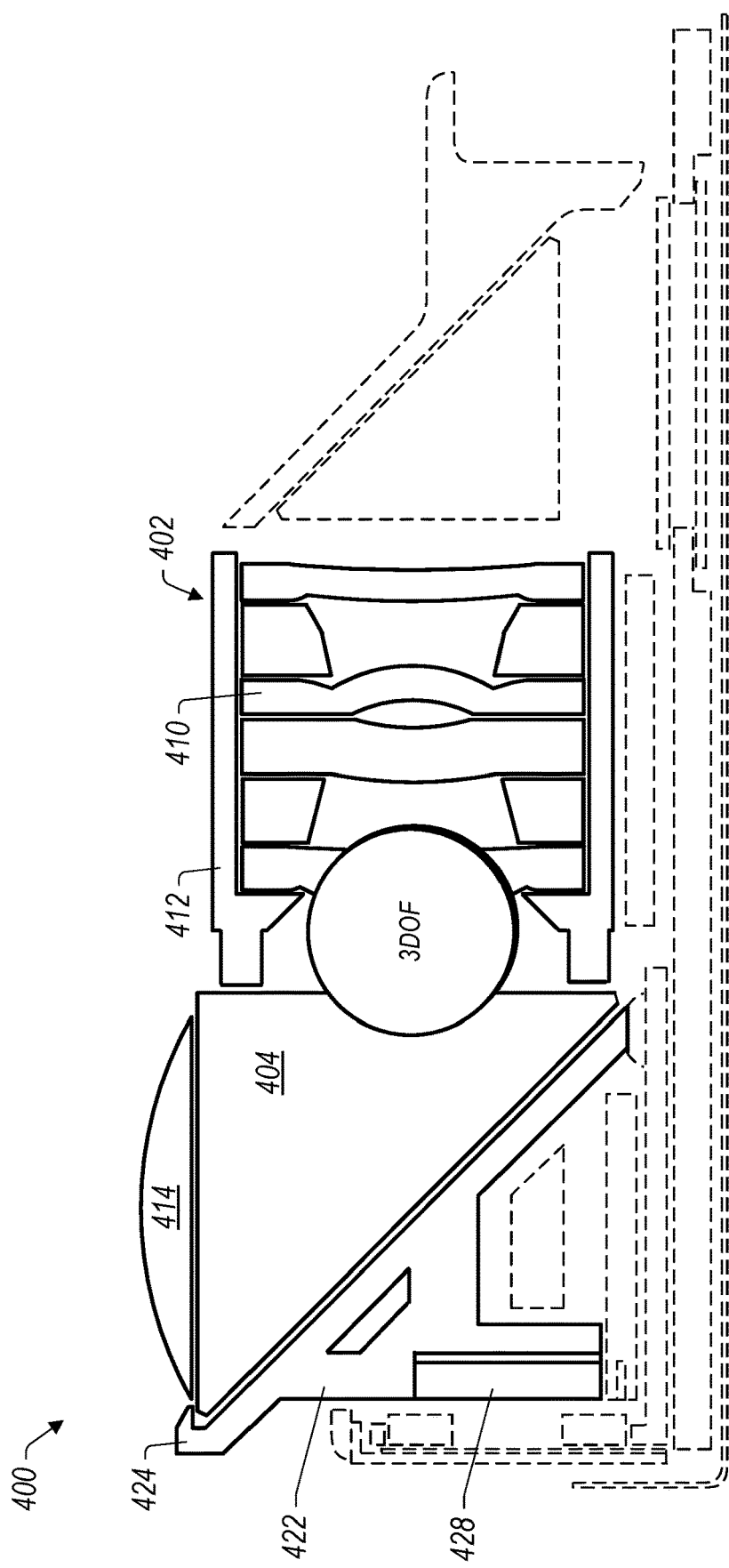

FIGS. 4A-4B illustrate side cross-sectional views of an example camera 400 with a folded optics arrangement and a bearing suspension arrangement, in accordance with some embodiments. In some embodiments, the camera 400 may include a lens group 402, a first prism 404, a second prism 406, and an image sensor 408. The lens group 402 may include one or more lens elements 410 disposed within a lens barrel 412.

According to some embodiments, the first prism 404 and/or the second prism 406 may be considered an optically powered prism. For example, as indicated in FIGS. 4A-4B, the first prism 404 maybe optically powered using one or more optical elements 414. As a non-limiting example, an optical element 414 may be disposed proximate the first prism 404. In some embodiments, the optical element 414 may be located adjacent a top portion of the first prism 404 and/or integrated with a top portion of the first prism 404. According to some embodiments, the optical element 414 may comprise a lens (e.g., a concave lens). Additionally, or alternatively, the optical element 414 may comprise a deformable membrane that may be deformed (e.g., via one or more actuators and/or fluid that may be disposed to change the shape of the deformable membrane) to vary the optical power of the optical element 414 and/or the first prism 404.

According to various embodiments, the camera 400 may include a bearing suspension arrangement. In some embodiments, the bearing suspension arrangement may include a base structure 416, a Z stage 418, an X stage 420, and a Y stage 422. The base structure 416, the Z stage 418, the X stage 420, and/or the Y stage 422 may be similar to, or the same as, the base structure 312, the Z stage 314, the X stage 316, and/or the Y stage 318, respectively, described above with reference to FIG. 3. The bearing suspension arrangement may be coupled with the lens group 402 and the first prism 404, and may allow the lens group 402 and the first prism 404 to move together in multiple directions (e.g., in 3DOF) relative to the image sensor 408.

In some embodiments, camera 400 may include a first prism holder 424 to hold the first prism 404, and a second prism holder 426 to hold the second prism 406. According to some examples, the first prism holder 424 and the lens barrel 412 may be attached to the Y stage 422. For example, each of the first prism holder 424 and the lens barrel 412 may be formed of one or more respective components. Additionally, or alternatively, each of the first prism holder 424 and the lens barrel 412 may be separately attached (e.g., via an adhesive) to the Y stage 422. In some embodiments, the first prism holder 424 and the lens barrel 412 may be formed of a single component that is attached to the Y stage 422. FIG. 4B highlights some components of the camera 400 that may be moveable in 3DOF. As indicated in FIG. 4B, the lens group 402 and the first prism 404 may move together (e.g., in lockstep) in multiple directions (e.g., in 3DOF). In some embodiments, moving the lens group 402 together with an optically powered first prism 404 may allow for a reduction of the overall size of the optical stack.

In some embodiments, the camera 400 may include an actuator module (e.g., the actuator modules described herein with reference to FIGS. 3 and 6A-6C). The actuator module may include an AF VCM actuator. The AF VCM actuator may include an AF magnet 428 and an AF coil 430. The AF magnet 428 may be attached to the Y stage 422. The AF coil 428 may be attached to the base structure 416. The AF magnet 428 may be located proximate the AF coil 430 such that the AF magnet 428 and the AF coil 430 are capable of magnetically interacting with each other, e.g., to provide AF movement. The actuator module may also include an OIS-X VCM actuator (not shown) and/or an OIS-Y VCM actuator (not shown), such as those described herein with reference to FIGS. 3 and 6A-6C.

According to some embodiments, the Z stage 418, the X stage 420, and/or the Y stage 422 may be preloaded against ball bearings (e.g., the Z-movement ball bearings 320, the X-movement ball bearings 322, and/or the Y-movement ball bearings 324 described above with reference to FIG. 3) of the bearing suspension arrangement. As a non-limiting example, a ferritic component 432 (e.g., iron, stainless steel, etc.) may be attached to the Z stage 418 below the AF magnet 428 to preload the Y stage 422 against one or more of the ball bearings of the bearing suspension system. In some embodiments, the ferritic component 432 may be insert-molded into the Z stage 418. While not shown in FIGS. 4A-4B, one or more additional ferritic components may be used in the camera 400 for preloading the stages of the bearing suspension arrangement against the ball bearings, e.g., as described above with reference to FIG. 3.

In some embodiments, the camera 400 may include a substrate 434 that may be coupled to the image sensor 408. In some examples, a filter 436 (e.g., an infrared filter) may also be coupled to the substrate 434. For instance, the filter 436 may be located above the image sensor 408 such that light passes through the filter 436 before reaching the image sensor 408.

FIGS. 5A-5B illustrate side cross-sectional views of another example camera 500 with a folded optics arrangement and a bearing suspension arrangement, in accordance with some embodiments. In some embodiments, the camera 500 may include a lens group 502, a first prism 504, a second prism 506, and an image sensor 508. The lens group 502 may include one or more lens elements 510 disposed within a lens barrel 512.

According to various embodiments, the camera 500 may include a bearing suspension arrangement. In some embodiments, the bearing suspension arrangement may include a base structure 514, a Z stage 516, an X stage 518, and a Y stage 520. The base structure 514, the Z stage 516, the X stage 518, and/or the Y stage 520 may be similar to, or the same as, the base structure 312, the Z stage 314, the X stage 316, and/or the Y stage 318, respectively, described above with reference to FIG. 3. The bearing suspension arrangement may be coupled with the lens group 502, and may allow the lens group 502 to move in multiple directions (e.g., in 3DOF) relative to the image sensor 508.

In some embodiments, camera 500 may include a first prism holder 522 to hold the first prism 504, and a second prism holder 524 to hold the second prism 506. In some examples, the first prism holder 522 and the second prism holder 524 may be attached to a fixed structure of the camera 500, such that the first prism 504 and the second prism 506 are maintained in a fixed position relative to movement of the lens group 502.

According to some examples, the lens barrel 512 may be attached to the Y stage 520, e.g., so that the lens group 502 moves, together with the Y stage 520, in multiple directions relative to the image sensor 508, the first prism 504, the second prism 506, and/or the base structure 514. FIG. 5B highlights some components of the camera 500 that may be moveable in 3DOF. As indicated in FIG. 5B, in contrast to the camera 400 described above with reference to FIG. 4, the lens group 502 may not move together with the first prism 504 in some embodiments.

In various embodiments, the camera 500 may include an actuator module (e.g., the actuator modules described herein with reference to FIGS. 3 and 6A-6C). The actuator module may include an AF VCM actuator. The AF VCM actuator may include an AF magnet 526 and an AF coil 528. The AF magnet 526 may be attached to the Y stage 520. The AF coil 526 may be attached to the base structure 514. The AF magnet 526 may be located proximate the AF coil 528 such that the AF magnet 526 and the AF coil 528 are capable of magnetically interacting with each other, e.g., to provide AF movement. The actuator module may also include an OIS-X VCM actuator (not shown) and/or an OIS-Y VCM actuator (not shown), such as those described herein with reference to FIGS. 3 and 6A-6C.

According to some embodiments, the Z stage 516, the X stage 518, and/or the Y stage 520 may be preloaded against ball bearings (e.g., the Z-movement ball bearings 320, the X-movement ball bearings 322, and/or the Y-movement ball bearings 324 described above with reference to FIG. 3) of the bearing suspension arrangement. As a non-limiting example, a ferritic component 530 (e.g., iron, stainless steel, etc.) may be attached to the Z stage 516 below the AF magnet 526 to preload the Y stage 520 against one or more of the ball bearings of the bearing suspension system. In some embodiments, the ferritic component 530 may be insert-molded into the Z stage 516. While not shown in FIGS. 5A-5B, one or more additional ferritic components may be used in the camera 500 for preloading the stages of the bearing suspension arrangement against the ball bearings, e.g., as described above with reference to FIG. 3.

In some embodiments, the camera 500 may include a substrate 532 that may be coupled to the image sensor 508. In some examples, a filter 534 (e.g., an infrared filter) may also be coupled to the substrate 532. For instance, the filter 534 may be located above the image sensor 508 such that light passes through the filter 534 before reaching the image sensor 508.

Figure 6A:
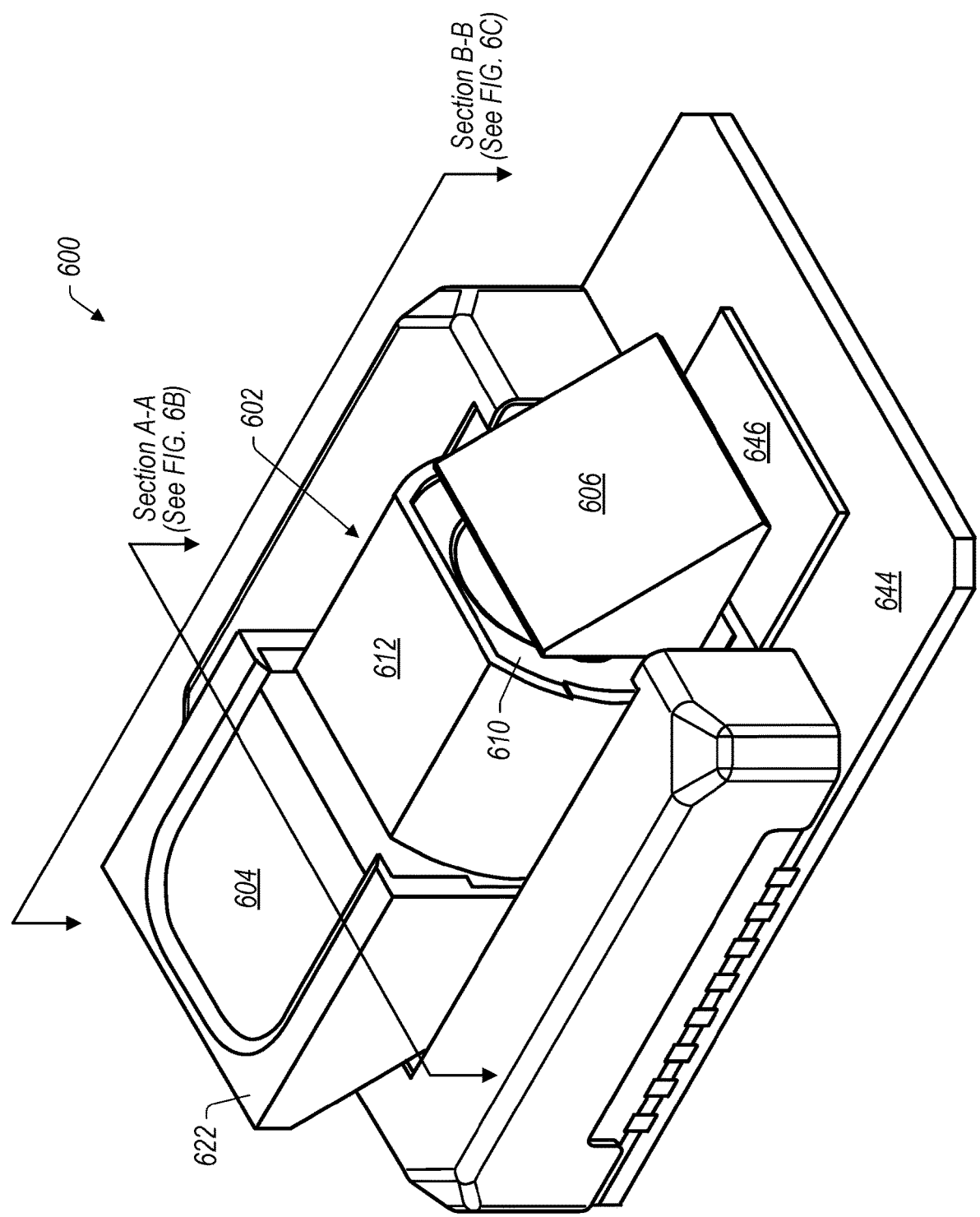
FIGS. 6A-6C each illustrate a respective view of an example camera with a folded optics arrangement and a bearing suspension arrangement, in accordance with some embodiments.
Figure 6B:
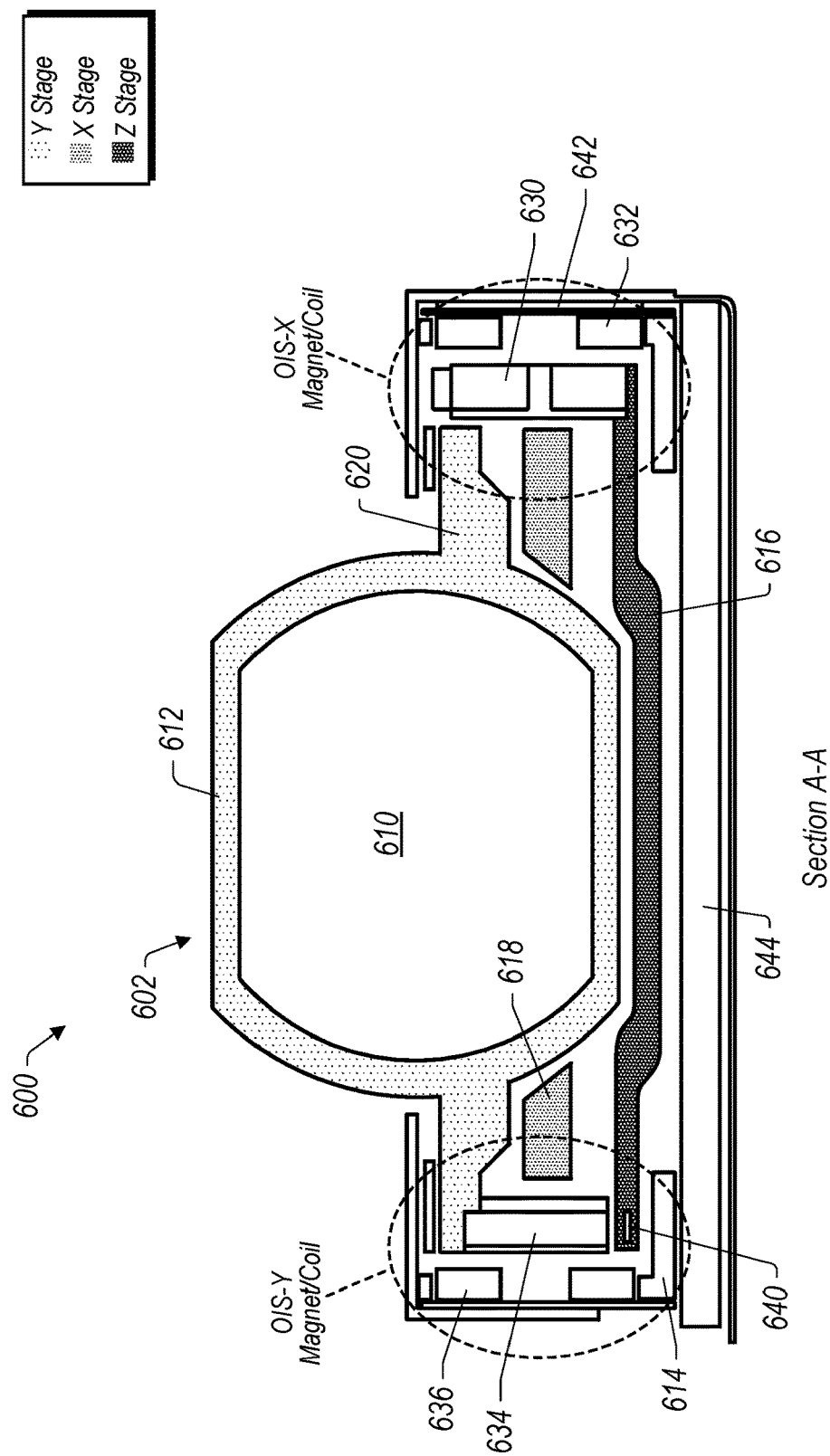
Figure 6C:
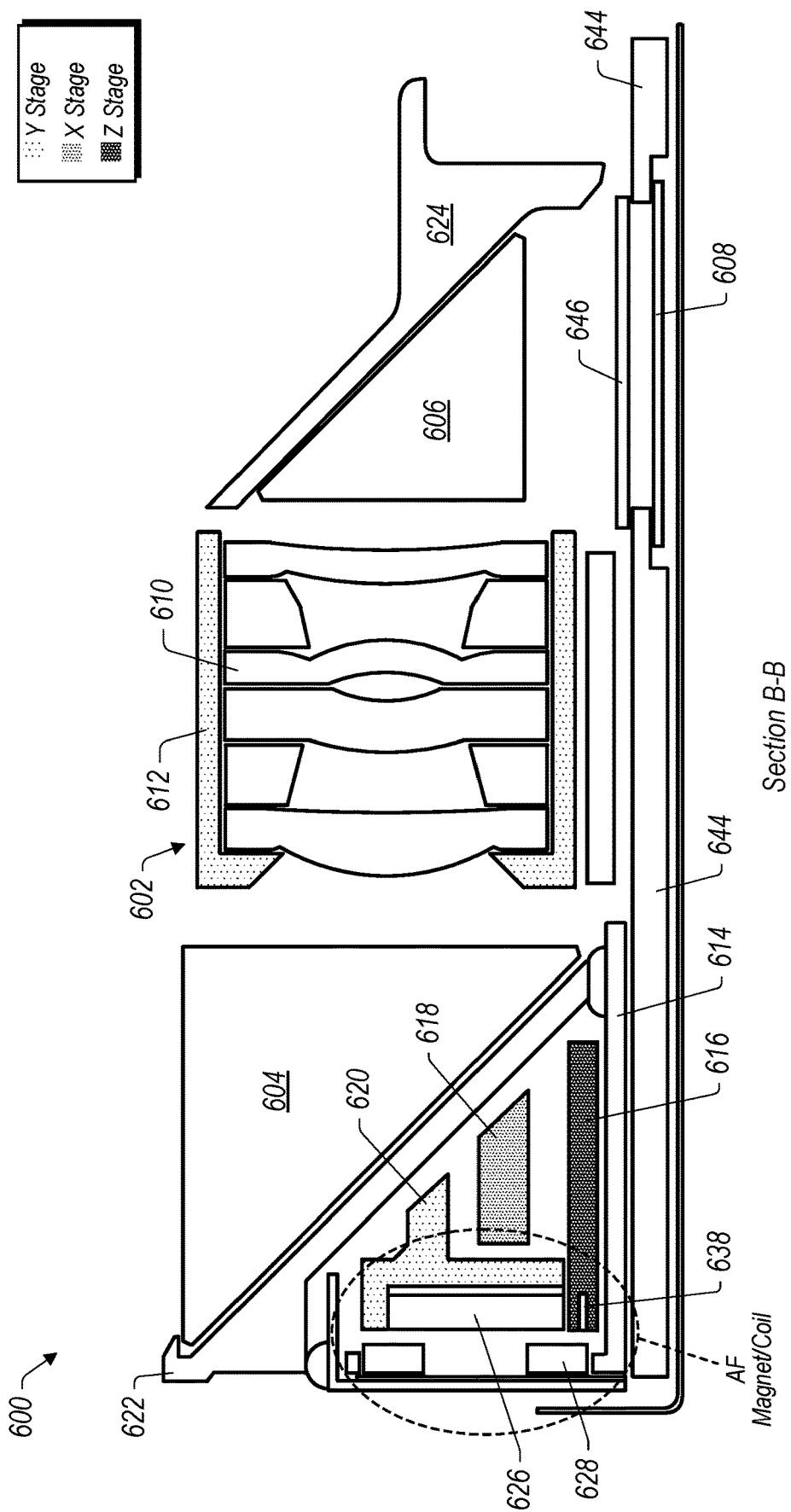

FIGS. 6A-6C each illustrate a respective view of an example camera 600 with a folded optics arrangement and a bearing arrangement, in accordance with some embodiments. FIG. 6A shows a perspective view of the camera 600. FIG. 6B shows a front cross-sectional view of the camera 600, including an example magnetic arrangement (e.g., magnet(s) and coil(s) of one or more actuators for shifting one or more optical components). FIG. 6C shows a side cross-sectional view of the camera 600, including the magnetic arrangement. In some non-limiting embodiments, the magnetic arrangement comprises three magnet-coil pairs, with the magnets moving and the coils being stationary. Furthermore, in some non-limiting embodiments, one magnet (e.g., a dual-pole magnet) may move in 1DOF, and the other two magnets may move in 3DOF. In some embodiments, the magnetic arrangement may reduce or eliminate magnetic interference with adjacent camera modules.

In some embodiments, the camera 600 may include a lens group 602, a first prism 604, a second prism 606, and an image sensor 608. The lens group 602 may include one or more lens elements 610 disposed within a lens barrel 612.

As indicated in FIGS. 6B-6C, the camera 600 may include a bearing suspension arrangement. In some embodiments, the bearing suspension arrangement may include a base structure 614, a Z stage 616, an X stage 618, and a Y stage 620. The base structure 614, the Z stage 616, the X stage 618, and/or the Y stage 620 may be similar to, or the same as, the base structure 312, the Z stage 314, the X stage 316, and/or the Y stage 318, respectively, described above with reference to FIG. 3. The bearing suspension arrangement may be coupled with the lens group 602, and may allow the lens group 602 to move in multiple directions (e.g., in 3DOF) relative to the image sensor 608.

In some embodiments, camera 600 may include a first prism holder 622 to hold the first prism 604, and a second prism holder 624 to hold the second prism 606. In some examples, the first prism holder 622 and the second prism holder 624 may be attached to a fixed structure of the camera 600, such that the first prism 604 and the second prism 606 are maintained in a fixed position relative to movement of the lens group 602.

According to some examples, the lens barrel 612 may be attached to the Y stage 620, e.g., so that the lens group 602 moves, together with the Y stage 620, in multiple directions relative to the image sensor 608, the first prism 604, the second prism 606, and/or the base structure 614.

In various embodiments, the camera 600 may include an actuator module (e.g., the actuator module described herein with reference to FIGS. 3-5B). The actuator module may include an AF VCM actuator (e.g., as indicated in FIG. 6C), an OIS-X VCM actuator (e.g., as indicated in FIG. 6B), and an OIS-Y VCM actuator (e.g., as indicated in FIG. 6B). Referring to FIG. 6C, the AF VCM actuator may include an AF magnet 626 and an AF coil 628. The AF magnet 626 may be attached to the Y stage 620. The AF magnet 626 may be a single-pole magnet in some embodiments. However, the AF magnet 626 may be another type of magnet (e.g., a dual-pole magnet) in other embodiments. The AF coil 626 may be attached to the base structure 614. The AF magnet 626 may be located proximate the AF coil 628 such that the AF magnet 626 and the AF coil 628 magnetically interact with each other, e.g., to provide AF movement (e.g., movement of the lens group 602 in the X-axis direction as allowed via at least the X stage 618 and X-movement ball bearings).

Referring to FIG. 6B, the OIS-X VCM actuator may include an OIS-X magnet 630 and an OIS-X coil 632. The OIS-X magnet 630 may be attached to the Z stage 620 (e.g., to a first side of the lens group 602). The OIS-X magnet 630 may be a dual-pole magnet in some embodiments. However, the OIS-X magnet 630 may be another type of magnet (e.g., a single-pole magnet) in other embodiments. The OIS-X coil 632 may be attached to the base structure 614. The OIS-X magnet 630 may be located proximate the OIS-X coil 632 such that the OIS-X magnet 630 and the OIS-X coil 632 magnetically interact with each other, e.g., to provide OIS-X movement (e.g., movement of the lens group 602 in the Z-axis direction as allowed via at least the Z stage 616 and Z-movement ball bearings).

Further referring to FIG. 6B, the OIS-Y VCM actuator may include an OIS-Y magnet 634 and an OIS-Y coil 636. The OIS-Y magnet 634 may be attached to the Y stage 620 (e.g., to a second side of the lens group 602). The second side of the lens group 602 may be opposite the first side of the lens group 602. The OIS-Y magnet 634 may be a single-pole magnet in some embodiments. However, the OIS-Y magnet 634 may be another type of magnet (e.g., a dual-pole magnet) in other embodiments. The OIS-Y coil 636 may be attached to the base structure 614. The OIS-Y magnet 634 may be located proximate the OIS-Y coil 636 such that the OIS-Y magnet 634 and the OIS-Y coil 636 magnetically interact with each other, e.g., to provide OIS-Y movement (e.g., movement of the lens group 602 in the Y-axis direction as allowed via at least the Y stage 620 and Y-movement ball bearings).

According to some embodiments, the Z stage 616, the X stage 618, and/or the Y stage 620 may be preloaded against ball bearings (e.g., the Z-movement ball bearings 320, the X-movement ball bearings 322, and/or the Y-movement ball bearings 324 described above with reference to FIG. 3) of the bearing suspension arrangement. As a non-limiting example, a ferritic component 638 (e.g., iron, stainless steel, etc.) may be attached to the Z stage 616 below the AF magnet 626 to preload the X stage 618 and/or the Y stage 620 against one or more of the ball bearings of the bearing suspension system, e.g., as indicated in FIG. 6C. In some embodiments, the ferritic component 638 may be insert-molded into the Z stage 616. Another ferritic component 640 may be attached to the Z stage 616 below the OIS-Y magnet 634 to preload the X stage 618 and/or the Y stage 620 against one or more of the ball bearings of the bearing suspension system, e.g., as indicated in FIG. 6B. In some embodiments, the ferritic component 640 may be insert-molded into the Z stage 616. Another ferritic component 642 may be attached to the OIS-X coil 632 and/or to the base structure 614 (e.g., proximate the OIS-X coil 632 and/or the OIS-X magnet 630) to preload the Z stage 616 against one or more of the ball bearings of the bearing suspension system, e.g., as indicated in FIG. 6B.

In some embodiments, the camera 600 may include a substrate 644 that may be coupled to the image sensor 608. In some examples, a filter 646 (e.g., an infrared filter) may also be coupled to the substrate 644. For instance, the filter 646 may be located above the image sensor 644 such that light passes through the filter 646 before reaching the image sensor 646.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 7:
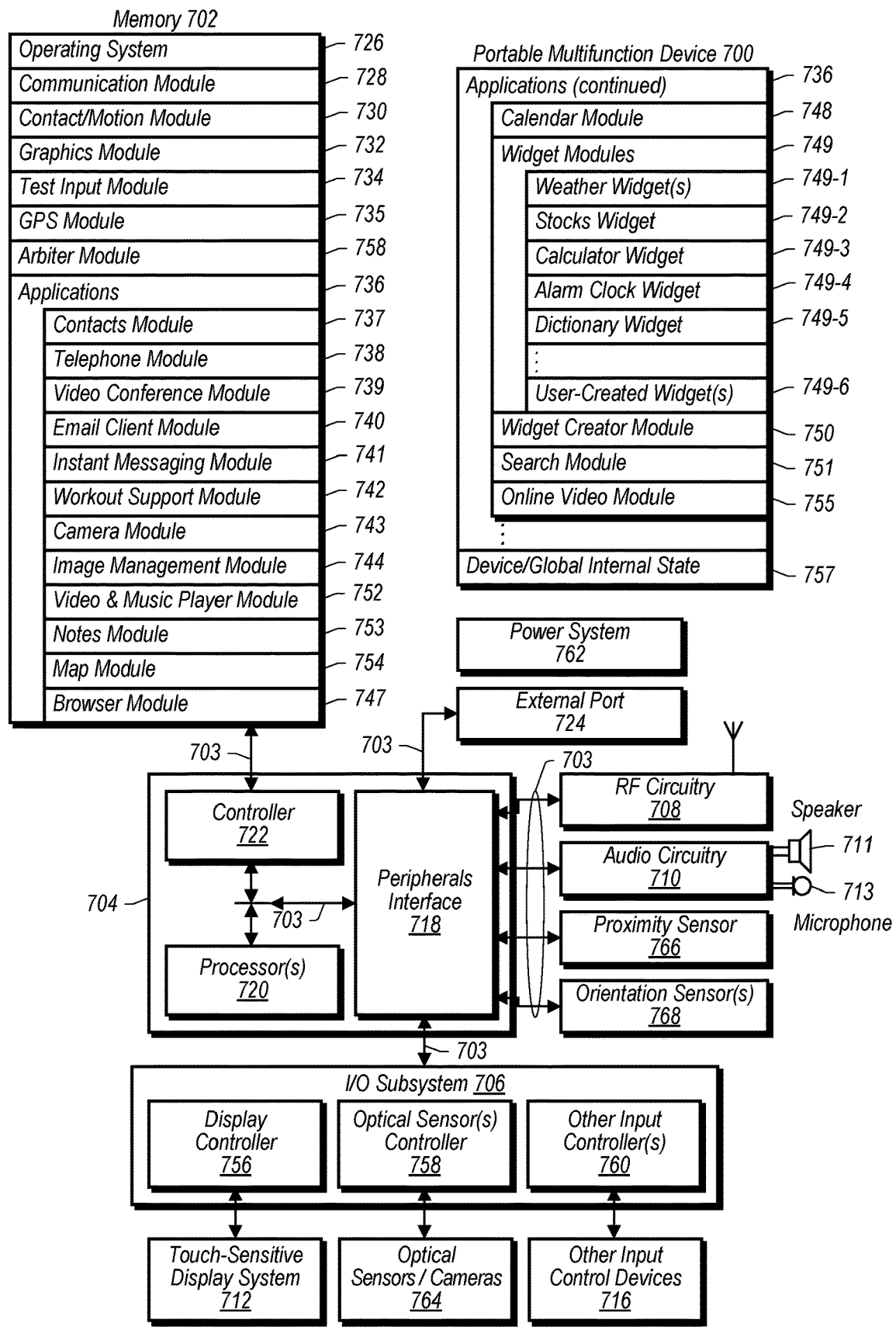
FIG. 7 illustrates a block diagram of an example portable multifunction device that may include a camera having a folded optics arrangement and and/or a bearing suspension arrangement, in accordance with some embodiments.

Attention is now directed toward embodiments of portable devices with cameras. FIG. 7 illustrates a block diagram of an example portable multifunction device 700 that may include one or more cameras (e.g., the cameras described above with reference to FIGS. 1-6), in accordance with some embodiments. Cameras 764 are sometimes called "optical sensors" for convenience, and may also be known as or called an optical sensor system. Device 700 may include memory 702 (which may include one or more computer readable storage mediums), memory controller 722, one or more processing units (CPUs) 720, peripherals interface 718, RF circuitry 708, audio circuitry 710, speaker 711, touch-sensitive display system 712, microphone 713, input/output (I/O) subsystem 706, other input or control devices 716, and external port 724. Device 700 may include multiple optical sensors 764. These components may communicate over one or more communication buses or signal lines 703.

It should be appreciated that device 700 is only one example of a portable multifunction device, and that device 700 may have more or fewer components than shown, may combine two or more components, or may have a different configuration or arrangement of the components. The various components shown in FIG. 7 may be implemented in hardware, software, or a combination of hardware and software, including one or more signal processing and/or application specific integrated circuits.

Memory 702 may include high-speed random access memory and may also include non-volatile memory, such as one or more magnetic disk storage devices, flash memory devices, or other non-volatile solid-state memory devices. Access to memory 702 by other components of device 700, such as CPU 720 and the peripherals interface 718, may be controlled by memory controller 722.

Peripherals interface 718 can be used to couple input and output peripherals of the device to CPU 720 and memory 702. The one or more processors 720 run or execute various software programs and/or sets of instructions stored in memory 702 to perform various functions for device 700 and to process data.

In some embodiments, peripherals interface 718, CPU 720, and memory controller 722 may be implemented on a single chip, such as chip 704. In some other embodiments, they may be implemented on separate chips.

RF (radio frequency) circuitry 708 receives and sends RF signals, also called electromagnetic signals. RF circuitry 708 converts electrical signals to/from electromagnetic signals and communicates with communications networks and other communications devices via the electromagnetic signals. RF circuitry 708 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 708 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 710, speaker 711, and microphone 713 provide an audio interface between a user and device 700. Audio circuitry 710 receives audio data from peripherals interface 718, converts the audio data to an electrical signal, and transmits the electrical signal to speaker 711. Speaker 711 converts the electrical signal to human-audible sound waves. Audio circuitry 710 also receives electrical signals converted by microphone 713 from sound waves. Audio circuitry 710 converts the electrical signal to audio data and transmits the audio data to peripherals interface 718 for processing. Audio data may be retrieved from and/or transmitted to memory 702 and/or RF circuitry 708 by peripherals interface 718. In some embodiments, audio circuitry 710 also includes a headset jack (e.g., 812, FIG. 8). The headset jack provides an interface between audio circuitry 710 and removable audio input/output peripherals, such as output-only headphones or a headset with both output (e.g., a headphone for one or both ears) and input (e.g., a microphone).

I/O subsystem 706 couples input/output peripherals on device 700, such as touch screen 712 and other input control devices 716, to peripherals interface 718. I/O subsystem 706 may include display controller 756 and one or more input controllers 760 for other input or control devices. The one or more input controllers 760 receive/send electrical signals from/to other input or control devices 716. The other input control devices 716 may include physical buttons (e.g., push buttons, rocker buttons, etc.), dials, slider switches, joysticks, click wheels, and so forth. In some alternate embodiments, input controller(s) 760 may be coupled to any (or none) of the following: a keyboard, infrared port, USB port, and a pointer device such as a mouse. The one or more buttons (e.g., 808, FIG. 8) may include an up/down button for volume control of speaker 711 and/or microphone 713. The one or more buttons may include a push button (e.g., 806, FIG. 8).

Touch-sensitive display 712 provides an input interface and an output interface between the device and a user. Display controller 756 receives and/or sends electrical signals from/to touch screen 712. Touch screen 712 displays visual output to the user. The visual output may include graphics, text, icons, video, and any combination thereof (collectively termed "graphics"). In some embodiments, some or all of the visual output may correspond to user-interface objects.

Touch screen 712 has a touch-sensitive surface, sensor or set of sensors that accepts input from the user based on haptic and/or tactile contact. Touch screen 712 and display controller 756 (along with any associated modules and/or sets of instructions in memory 702) detect contact (and any movement or breaking of the contact) on touch screen 712 and converts the detected contact into interaction with user-interface objects (e.g., one or more soft keys, icons, web pages or images) that are displayed on touch screen 712. In an example embodiment, a point of contact between touch screen 712 and the user corresponds to a finger of the user.

Touch screen 712 may use LCD (liquid crystal display) technology, LPD (light emitting polymer display) technology, or LED (light emitting diode) technology, although other display technologies may be used in other embodiments. Touch screen 712 and display controller 756 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 712. In an example embodiment, projected mutual capacitance sensing technology is used, such as that found in the iPhone®, iPod Touch®, and iPad® from Apple Inc. of Cupertino, California.

Touch screen 712 may have a video resolution in excess of 800 dpi. In some embodiments, the touch screen has a video resolution of approximately 860 dpi. The user may make contact with touch screen 712 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 700 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 712 or an extension of the touch-sensitive surface formed by the touch screen.

Device 700 also includes power system 762 for powering the various components. Power system 762 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 700 may also include one or more optical sensors or cameras 764. FIG. 7 shows an optical sensor 764 coupled to optical sensor controller 758 in I/O subsystem 706. Optical sensor 764 may include charge-coupled device (CCD) or complementary metal-oxide semiconductor (CMOS) phototransistors. Optical sensor 764 receives light from the environment, projected through one or more lens, and converts the light to data representing an image. In conjunction with imaging module 743 (also called a camera module), optical sensor 764 may capture still images or video. In some embodiments, an optical sensor 764 is located on the back of device 700, opposite touch screen display 712 on the front of the device, so that the touch screen display 712 may be used as a viewfinder for still and/or video image acquisition. In some embodiments, another optical sensor is located on the front of the device so that the user's image may be obtained for videoconferencing while the user views the other video conference participants on the touch screen display.

Device 700 may also include one or more proximity sensors 766. FIG. 7 shows proximity sensor 766 coupled to peripherals interface 718. Alternately, proximity sensor 766 may be coupled to input controller 760 in I/O subsystem 706. In some embodiments, the proximity sensor 766 turns off and disables touch screen 712 when the multifunction device 700 is placed near the user's ear (e.g., when the user is making a phone call).

Device 700 includes one or more orientation sensors 768. In some embodiments, the one or more orientation sensors 768 include one or more accelerometers (e.g., one or more linear accelerometers and/or one or more rotational accelerometers). In some embodiments, the one or more orientation sensors 768 include one or more gyroscopes. In some embodiments, the one or more orientation sensors 768 include one or more magnetometers. In some embodiments, the one or more orientation sensors 768 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 700. In some embodiments, the one or more orientation sensors 768 include any combination of orientation/rotation sensors. FIG. 7 shows the one or more orientation sensors 768 coupled to peripherals interface 718. Alternately, the one or more orientation sensors 768 may be coupled to an input controller 760 in I/O subsystem 706. In some embodiments, information is displayed on the touch screen display 712 in a portrait view or a landscape view based on an analysis of data received from the one or more orientation sensors 768.

In some embodiments, the software components stored in memory 702 include operating system 726, communication module (or set of instructions) 728, contact/motion module (or set of instructions) 730, graphics module (or set of instructions) 732, text input module (or set of instructions) 734, Global Positioning System (GPS) module (or set of instructions) 735, arbiter module 758 and applications (or sets of instructions) 736. Furthermore, in some embodiments memory 702 stores device/global internal state 757. Device/global internal state 757 includes one or more of: active application state, indicating which applications, if any, are currently active; display state, indicating what applications, views or other information occupy various regions of touch screen display 712; sensor state, including information obtained from the device's various sensors and input control devices 716; and location information concerning the device's location and/or attitude.

Operating system 726 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 728 facilitates communication with other devices over one or more external ports 724 and also includes various software components for handling data received by RF circuitry 708 and/or external port 724. External port 724 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 730 may detect contact with touch screen 712 (in conjunction with display controller 756) and other touch sensitive devices (e.g., a touchpad or physical click wheel). Contact/motion module 730 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 730 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 730 and display controller 756 detect contact on a touchpad.

Contact/motion module 730 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 732 includes various known software components for rendering and displaying graphics on touch screen 712 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 732 stores data representing graphics to be used. Each graphic may be assigned a corresponding code. Graphics module 732 receives, from applications etc., one or more codes specifying graphics to be displayed along with, if necessary, coordinate data and other graphic property data, and then generates screen image data to output to display controller 756.

Text input module 734, which may be a component of graphics module 732, provides soft keyboards for entering text in various applications (e.g., contacts 737, e-mail 740, 1M 741, browser 747, and any other application that needs text input).

GPS module 735 determines the location of the device and provides this information for use in various applications (e.g., to telephone 738 for use in location-based dialing, to camera 743 as picture/video metadata, and to applications that provide location-based services such as weather widgets, local yellow page widgets, and map/navigation widgets).

Applications 736 may include the following modules (or sets of instructions), or a subset or superset thereof:

contacts module 737 (sometimes called an address book or contact list);
telephone module 738;
video conferencing module 739;
e-mail client module 740;
instant messaging (IM) module 741;
workout support module 742;
camera module 743 for still and/or video images;
image management module 744;
browser module 747;
calendar module 748;
widget modules 749, which may include one or more of: weather widget 749-1, stocks widget 749-2, calculator widget 749-3, alarm clock widget 749-4, dictionary widget 749-5, and other widgets obtained by the user, as well as user-created widgets 749-6;
widget creator module 750 for making user-created widgets 749-6;
search module 751;
video and music player module 752, which may be made up of a video player module and a music player module;
notes module 753;
map module 754; and/or
online video module 755.

Examples of other applications 736 that may be stored in memory 702 include other word processing applications, other image editing applications, drawing applications, presentation applications, JAVA-enabled applications, encryption, digital rights management, voice recognition, and voice replication.

In conjunction with touch screen 712, display controller 756, contact module 730, graphics module 732, and text input module 734, contacts module 737 may be used to manage an address book or contact list (e.g., stored in application internal state 757), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 738, video conference 739, e-mail 740, or IM 741; and so forth.

In conjunction with RF circuitry 708, audio circuitry 710, speaker 711, microphone 713, touch screen 712, display controller 756, contact module 730, graphics module 732, and text input module 734, telephone module 738 may be used to enter a sequence of characters corresponding to a telephone number, access one or more telephone numbers in address book 737, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 708, audio circuitry 710, speaker 711, microphone 713, touch screen 712, display controller 756, optical sensor 764, optical sensor controller 758, contact module 730, graphics module 732, text input module 734, contact list 737, and telephone module 738, videoconferencing module 739 includes executable instructions to initiate, conduct, and terminate a video conference between a user and one or more other participants in accordance with user instructions.

In conjunction with RF circuitry 708, touch screen 712, display controller 756, contact module 730, graphics module 732, and text input module 734, e-mail client module 740 includes executable instructions to create, send, receive, and manage e-mail in response to user instructions. In conjunction with image management module 744, e-mail client module 740 makes it very easy to create and send e-mails with still or video images taken with camera module 743.

In conjunction with RF circuitry 708, touch screen 712, display controller 756, contact module 730, graphics module 732, and text input module 734, the instant messaging module 741 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 708, touch screen 712, display controller 756, contact module 730, graphics module 732, text input module 734, GPS module 735, map module 754, and music player module 746, workout support module 742 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 712, display controller 756, optical sensor(s) 764, optical sensor controller 758, contact module 730, graphics module 732, and image management module 744, camera module 743 includes executable instructions to capture still images or video (including a video stream) and store them into memory 702, modify characteristics of a still image or video, or delete a still image or video from memory 702.

In conjunction with touch screen 712, display controller 756, contact module 730, graphics module 732, text input module 734, and camera module 743, image management module 744 includes executable instructions to arrange, modify (e.g., edit), or otherwise manipulate, label, delete, present (e.g., in a digital slide show or album), and store still and/or video images.

In conjunction with RF circuitry 708, touch screen 712, display system controller 756, contact module 730, graphics module 732, and text input module 734, browser module 747 includes executable instructions to browse the Internet in accordance with user instructions, including searching, linking to, receiving, and displaying web pages or portions thereof, as well as attachments and other files linked to web pages.

In conjunction with RF circuitry 708, touch screen 712, display system controller 756, contact module 730, graphics module 732, text input module 734, e-mail client module 740, and browser module 747, calendar module 748 includes executable instructions to create, display, modify, and store calendars and data associated with calendars (e.g., calendar entries, to do lists, etc.) in accordance with user instructions.

In conjunction with RF circuitry 708, touch screen 712, display system controller 756, contact module 730, graphics module 732, text input module 734, and browser module 747, widget modules 749 are mini-applications that may be downloaded and used by a user (e.g., weather widget 549-1, stocks widget 549-2, calculator widget 749-3, alarm clock widget 749-4, and dictionary widget 749-5) or created by the user (e.g., user-created widget 749-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 708, touch screen 712, display system controller 756, contact module 730, graphics module 732, text input module 734, and browser module 747, the widget creator module 750 may be used by a user to create widgets (e.g., turning a user-specified portion of a web page into a widget).

In conjunction with touch screen 712, display system controller 756, contact module 730, graphics module 732, and text input module 734, search module 751 includes executable instructions to search for text, music, sound, image, video, and/or other files in memory 702 that match one or more search criteria (e.g., one or more user-specified search terms) in accordance with user instructions.

In conjunction with touch screen 712, display system controller 756, contact module 730, graphics module 732, audio circuitry 710, speaker 711, RF circuitry 708, and browser module 747, video and music player module 752 includes executable instructions that allow the user to download and play back recorded music and other sound files stored in one or more file formats, such as MP3 or AAC files, and executable instructions to display, present or otherwise play back videos (e.g., on touch screen 712 or on an external, connected display via external port 724). In some embodiments, device 700 may include the functionality of an MP3 player.

In conjunction with touch screen 712, display controller 756, contact module 730, graphics module 732, and text input module 734, notes module 753 includes executable instructions to create and manage notes, to do lists, and the like in accordance with user instructions.

In conjunction with RF circuitry 708, touch screen 712, display system controller 756, contact module 730, graphics module 732, text input module 734, GPS module 735, and browser module 747, map module 754 may be used to receive, display, modify, and store maps and data associated with maps (e.g., driving directions; data on stores and other points of interest at or near a particular location; and other location-based data) in accordance with user instructions.

In conjunction with touch screen 712, display system controller 756, contact module 730, graphics module 732, audio circuitry 710, speaker 711, RF circuitry 708, text input module 734, e-mail client module 740, and browser module 747, online video module 755 includes instructions that allow the user to access, browse, receive (e.g., by streaming and/or download), play back (e.g., on the touch screen or on an external, connected display via external port 724), send an e-mail with a link to a particular online video, and otherwise manage online videos in one or more file formats, such as H.264. In some embodiments, instant messaging module 741, rather than e-mail client module 740, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 702 may store a subset of the modules and data structures identified above. Furthermore, memory 702 may store additional modules and data structures not described above.

In some embodiments, device 700 is a device where operation of a predefined set of functions on the device is performed exclusively through a touch screen and/or a touchpad. By using a touch screen and/or a touchpad as the primary input control device for operation of device 700, the number of physical input control devices (such as push buttons, dials, and the like) on device 700 may be reduced.

The predefined set of functions that may be performed exclusively through a touch screen and/or a touchpad include navigation between user interfaces. In some embodiments, the touchpad, when touched by the user, navigates device 700 to a main, home, or root menu from any user interface that may be displayed on device 700. In such embodiments, the touchpad may be referred to as a "menu button." In some other embodiments, the menu button may be a physical push button or other physical input control device instead of a touchpad.

Figure 8:
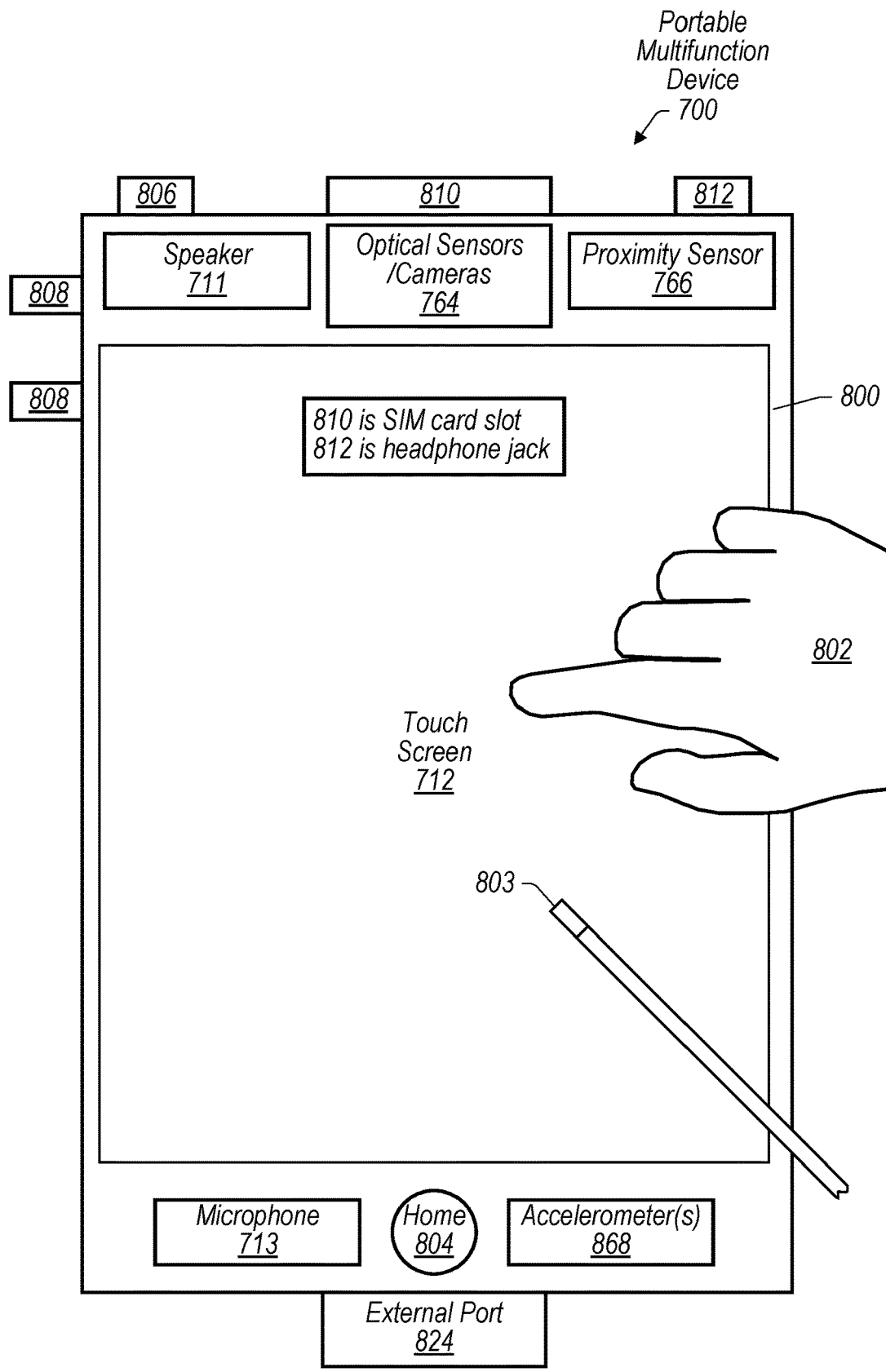
FIG. 8 depicts an example portable multifunction device that may include a camera having a folded optics arrangement and/or a bearing suspension arrangement, in accordance with some embodiments.

FIG. 8 depicts illustrates an example portable multifunction device 700 that may include one or more cameras (e.g., the cameras described above with reference to FIGS. 1-6), in accordance with some embodiments. The device 700 may have a touch screen 712. The touch screen 712 may display one or more graphics within user interface (UI) 800. In this embodiment, as well as others described below, a user may select one or more of the graphics by making a gesture on the graphics, for example, with one or more fingers 802 (not drawn to scale in the figure) or one or more styluses 803 (not drawn to scale in the figure).

Device 700 may also include one or more physical buttons, such as "home" or menu button 804. As described previously, menu button 804 may be used to navigate to any application 736 in a set of applications that may be executed on device 700. Alternatively, in some embodiments, the menu button 804 is implemented as a soft key in a GUI displayed on touch screen 712.

In one embodiment, device 700 includes touch screen 712, menu button 804, push button 806 for powering the device on/off and locking the device, volume adjustment button(s) 808, Subscriber Identity Module (SIM) card slot 810, head set jack 812, and docking/charging external port 824. Push button 806 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 700 also may accept verbal input for activation or deactivation of some functions through microphone 713.

It should be noted that, although many of the examples herein are given with reference to optical sensor(s)/camera(s) 764 (on the front of a device), one or more rear-facing cameras or optical sensors that are pointed opposite from the display may be used instead of, or in addition to, an optical sensor(s)/camera(s) 764 on the front of a device.

Example Computer System

Figure 9:
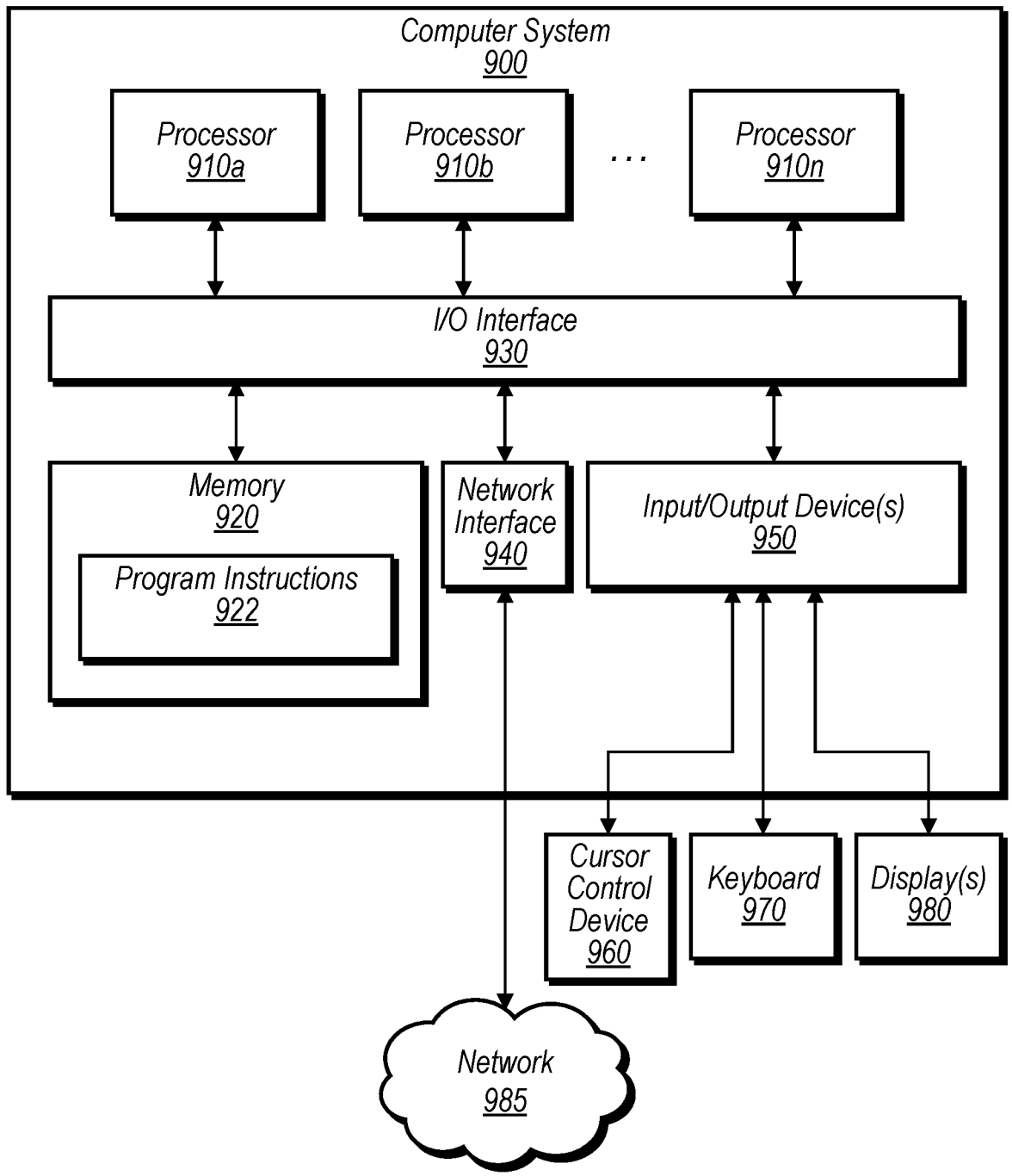
FIG. 9 illustrates an example computer system that may include a camera having a folded optics arrangement and/or a bearing suspension arrangement, in accordance with some embodiments.

FIG. 9 illustrates an example computer system 900 that may include one or more cameras (e.g., the cameras described above with reference to FIGS. 1-6), according to some embodiments. The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 900, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store camera control program instructions 922 and/or camera control data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement a lens control application 924 incorporating any of the functionality described above. Additionally, existing camera control data 932 of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a folded optics arrangement to fold a path of light, the folded optics arrangement comprising:
one or more prisms; and
a lens group, wherein the lens group includes one or more lens elements;
an image sensor configured to capture light that has passed through the lens group and the one or more prisms;
an actuator configured to cause relative movement between the lens group and the image sensor along three axes; and
a bearing suspension arrangement comprising stages configured to move on ball bearings to allow for the relative movement along the three axes, wherein for motion along individual ones of the three axes, a respective set of the ball bearings is engaged, wherein the respective sets of ball bearings differ from one another.

2. The camera of claim 1, wherein the bearing suspension arrangement comprises:
a first stage configured to move in at least a first direction orthogonal to an optical axis defined by the lens group;
a second stage configured to move in at least a second direction orthogonal to the first direction and parallel to the optical axis; and
a third stage configured to move in at least a third direction orthogonal to the first direction and the second direction;
wherein the first stage, the second stage, and the third stage are configured to move relative to a base structure.

3. The camera of claim 2, wherein the ball bearings comprise:
a first set of ball bearings disposed between the base structure and the first stage, to allow movement of the first stage in the first direction;
a second set of ball bearings disposed between the first stage and the second stage, to allow movement of the second stage, together with the third stage, in the second direction; and
a third set of ball bearings disposed between the second stage and the third stage, to allow movement of the third stage in the third direction.

4. The camera of claim 1, wherein the actuator comprises a voice coil motor (VCM) actuator.

5. The camera of claim 4, wherein the bearing suspension arrangement further comprises:
ferritic components, comprising:
a first ferritic component attached to a base structure and positioned proximate a first magnet of the VCM actuator to preload the first stage against a first set of ball bearings;
a second ferritic component attached to the first stage and positioned proximate a second magnet of the VCM actuator to at least one of:
preload a second stage against a second set of ball bearings; or
preload a third stage against the third set of ball bearings; and
a third ferritic component attached to the first stage and positioned proximate a third magnet of the VCM actuator to at least one of:
preload the second stage against the second set of ball bearings; or
preload the third stage against the third set of ball bearings.

6. The camera of claim 1, wherein the one or more prisms comprise a first prism and a second prism that are positioned along an optical axis defined by the lens group.

7. A camera, comprising:
a folded optics arrangement to fold a path of light, the folded optics arrangement comprising:
a first prism;
a second prism; and
a lens group disposed between the first prism and the second prism, wherein the lens group includes one or more lens elements;
an image sensor configured to capture light that has passed through the first prism, the lens group, and the second prism;
an actuator configured to move at least the lens group along multiple axes relative to the image sensor; and
a bearing suspension arrangement comprising stages configured to move on ball bearings, such that the stages collectively suspend the lens group from a base structure and allow the lens group to move along the multiple axes;
wherein the actuator comprises:
stationary coils attached to the base structure; and
magnets that are moveable relative to the stationary coils, respective ones of the magnets attached to respective ones of the stages such that the magnets and coils are capable of magnetically interacting with each other to produce Lorentz forces that move the stages, together with the lens group, along the multiple axes.

8. The camera of claim 7, wherein the bearing suspension arrangement is configured to allow the lens group to move in three degrees of freedom.

9. The camera of claim 7, wherein the bearing suspension arrangement comprises:
the base structure;
a first stage configured to move in at least a first direction orthogonal to an optical axis defined by the lens group;
a second stage configured to move in at least a second direction orthogonal to the first direction and parallel to the optical axis; and
a third stage configured to move in at least a third direction orthogonal to the first direction and the second direction;
wherein the first stage, the second stage, and the third stage are configured to move relative to the base structure.

10. The camera of claim 9, wherein the ball bearings comprise:
a first set of ball bearings disposed between the base structure and the first stage, to allow movement of the first stage in the first direction;
a second set of ball bearings disposed between the first stage and the second stage, to allow movement of the second stage, together with the third stage, in the second direction; and
a third set of ball bearings disposed between the second stage and the third stage, to allow movement of the third stage in the third direction.

11. The camera of claim 9, wherein the camera further comprises:
a lens carrier fixedly coupled with the lens group, wherein the lens carrier is mounted on the third stage.

12. The camera of claim 7, wherein the stationary coils comprise:
- a first coil attached to a first side of the base structure;
- a second coil attached to a second side of the base structure; and
- a third coil attached to a third side of the base structure, wherein the third side is opposite the second side relative to the lens group.

13. The device of claim 12, the magnets comprising:
- a first magnet attached to the third stage and positioned proximate the first coil, such that the first magnet and the first coil are capable of magnetically interacting with each other to produce Lorentz forces that move the second stage, together with the third stage and the lens group, in the second direction;
- a second magnet attached to the third stage and positioned proximate the second coil, such that the second magnet and the second coil are capable of magnetically interacting with each other to produce Lorentz forces that move the third stage, together with the lens group, in the third direction; and
- a third magnet attached to the first stage and positioned proximate the third coil, such that the third magnet and the third coil are capable of magnetically interacting with each other to produce Lorentz forces that move the stages, together with the lens group, in the first direction.

14. A system, comprising:
- an actuator configured to move cause relative movement between a lens group and an image sensor along multiple axes, wherein the lens group is included in a folded optics arrangement that is configured to fold a path of light, and wherein the lens group includes one or more lens elements; and
- a bearing suspension arrangement comprising stages configured to move on ball bearings to allow for the relative movement along the multiple axes, wherein for motion along individual ones of the multiple axes, a respective set of the ball bearings is engaged, wherein the respective sets of ball bearings differ from one another;
- wherein the actuator comprises:
  - stationary coils attached to a base structure; and
  - magnets that are moveable relative to the stationary coils, respective ones of the magnets attached to respective ones of the stages such that the magnets and coils are capable of magnetically interacting with each other to produce Lorentz forces that move the stages along the multiple axes.

15. The system of claim 14, further comprising:
- the folded optics arrangement, comprising:
  - at least a first prism; and
  - the lens group.

16. The system of claim 15, wherein the folded optics arrangement further comprises:
- a second prism, wherein the lens group is disposed between the first prism and the second prism.

17. The system of claim 14, further comprising:
- the image sensor configured to capture light that has passed through the folded optics arrangement.

18. The system of claim 14, wherein the bearing suspension arrangement comprises:
- a first stage configured to move in at least a first direction orthogonal to an optical axis defined by the lens group; and
- a second stage configured to move in at least a second direction orthogonal to the first direction and parallel to the optical axis.

19. The system of claim 18, wherein the bearing suspension arrangement further comprises:
- a third stage configured to move in at least a third direction orthogonal to the first direction and the second direction.

20. The system of claim 19, wherein the ball bearings comprise:
- a first set of ball bearings disposed between the base structure and the first stage, to allow movement of the first stage in the first direction;
- a second set of ball bearings disposed between the first stage and the second stage, to allow movement of the second stage, together with the third stage, in the second direction; and
- a third set of ball bearings disposed between the second stage and the third stage, to allow movement of the third stage in the third direction.

* * * * *